United States Patent
Piccolo et al.

(10) Patent No.: US 11,688,020 B1
(45) Date of Patent: *Jun. 27, 2023

(54) HOME TELEMATICS DEVICES AND INSURANCE APPLICATIONS

(71) Applicant: Liberty Mutual Insurance Company, Boston, MA (US)

(72) Inventors: Brian Stephen Piccolo, Boston, MA (US); Guy Michael Mabry, Boston, MA (US); Courtney Taryn Quinn, Boston, MA (US); Normand Francis Olean, Jr., Boston, MA (US)

(73) Assignee: LIBERTY MUTUAL INSURANCE COMPANY, Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/840,429

(22) Filed: Jun. 14, 2022

Related U.S. Application Data

(63) Continuation of application No. 16/879,922, filed on May 21, 2020, now Pat. No. 11,393,042, which is a continuation of application No. 14/324,742, filed on Jul. 7, 2014, now Pat. No. 10,769,727.

(60) Provisional application No. 61/845,140, filed on Jul. 11, 2013.

(51) Int. Cl.
  *G06Q 40/00*  (2023.01)
  *G06Q 40/08*  (2012.01)
  *H04L 12/28*  (2006.01)

(52) U.S. Cl.
  CPC ......... *G06Q 40/08* (2013.01); *H04L 12/2812* (2013.01); *H04L 2012/2841* (2013.01)

(58) Field of Classification Search
  CPC . G06F 17/30539; G06K 9/6253; G06Q 40/08
  See application file for complete search history.

(56) References Cited

U.S. PATENT DOCUMENTS

| | | | |
|---|---|---|---|
| 7,551,849 | B1 | 6/2009 | Abad |
| 7,613,659 | B1 | 11/2009 | Hoffman et al. |
| 8,041,636 | B1 | 10/2011 | Hunter et al. |

(Continued)

FOREIGN PATENT DOCUMENTS

| | | |
|---|---|---|
| SK | 5988 Y1 | 1/2012 |

OTHER PUBLICATIONS

Sultanem (Using appliance signatures for monitoring residential loads at meter panel level, in IEEE Transactions on Power Delivery, vol. 6, No. 4, pp. 1380-1385, Oct. 1991) (Year: 1991).*

(Continued)

*Primary Examiner* — Mike Anderson
*Assistant Examiner* — Mark H Gaw
(74) *Attorney, Agent, or Firm* — Alston & Bird LLP

(57) ABSTRACT

Home telematics devices are engineered to identify unique device signatures for all appliances, fixtures, and so on that generate voltage noise, pressure waves, and acoustic responses throughout a property. The device signatures comprise the inventory of devices in the insured's home and are used to create an electronic record of the devices that assists him in filing a claim with an insurer that is quick and easy after a theft or total loss. Using the device signatures provided by home telematics devices' sensing an itemization technology, fraud detection is also possible. Additionally, analytics software predicts possible failure by analyzing the device signatures.

18 Claims, 13 Drawing Sheets

(56) References Cited

U.S. PATENT DOCUMENTS

| | | |
|---|---|---|
| 8,429,153 B2 | 4/2013 | Birdwell et al. |
| 8,775,428 B2 | 7/2014 | Birdwell et al. |
| 9,058,611 B2 | 6/2015 | Saunders et al. |
| 10,769,727 B1 | 9/2020 | Piccolo et al. |
| 11,393,042 B1 | 7/2022 | Piccolo et al. |
| 2004/0019609 A1 | 1/2004 | Orton et al. |
| 2005/0046584 A1 | 3/2005 | Breed |
| 2005/0060626 A1 | 3/2005 | Rajski et al. |
| 2006/0033625 A1* | 2/2006 | Johnson ............... G06Q 40/08 705/2 |
| 2006/0212357 A1 | 9/2006 | White et al. |
| 2006/0282342 A1 | 12/2006 | Chapman |
| 2007/0192863 A1 | 8/2007 | Kapoor et al. |
| 2009/0125339 A1 | 5/2009 | Silverbrook et al. |
| 2009/0220166 A1 | 9/2009 | Choi et al. |
| 2010/0076793 A1 | 3/2010 | Goldstein et al. |
| 2010/0172567 A1 | 7/2010 | Prokoski |
| 2010/0235285 A1 | 9/2010 | Hoffberg |
| 2010/0317420 A1 | 12/2010 | Hoffberg |
| 2010/0332245 A1* | 12/2010 | Choubey ............... G16Z 99/00 705/2 |
| 2011/0181422 A1 | 7/2011 | Tran |
| 2011/0219035 A1 | 9/2011 | Korsunsky et al. |
| 2011/0282596 A1 | 11/2011 | Patel et al. |
| 2011/0320222 A1 | 12/2011 | Fini et al. |
| 2012/0095783 A1 | 4/2012 | Buentello et al. |
| 2013/0054603 A1* | 2/2013 | Birdwell ............. G06F 16/2465 707/738 |
| 2013/0173632 A1 | 7/2013 | Birdwell et al. |
| 2013/0204645 A1 | 8/2013 | Lehman et al. |
| 2013/0344859 A1 | 12/2013 | Abramson et al. |

OTHER PUBLICATIONS

"Building Energy Technology: Non-lntrusive Appliance Load Monitoring," (Copyright) 2014 Fraunhofer Center for Sustainable Energy Systems, Boston, <http:/cse.fraunhofer.org/building-energy-technology/non-intrusive-appliance-load-monitoring/> [retrieved Jun. 5, 2014], 2 pages.

"Know Your Stuff (Registered)—Home Inventory,"(copyright) 2007 Insurance Information Institute, New York, <https://www.knowyourstuff.org/iii/login.html> [retrieved May 12, 2014], 1 page.

"Non-lntrusive Load Monitoring (NILM) and Similar Methods," Website: Energy Saving and Monitoring in New Zealand, Feb. 24, 2014, <http://www.energymonitor.org.nz/non-intrusive-load-monitoring> [retrieved Jun. 5, 2014], 5 pages.

Froehlich, J., et al., "Disaggregated End-Use Energy Sensing for the Smart Grid," Pervasive Computing 10(1):28-39, Jan.-Mar. 2011.

Weiss, M., et al., "Leveraging Smart Meter Data to Recognize Home Appliances," IEEE International Conference on Pervasive Computing and Communications (PerCom), Mar. 19-23, 2012, Lugano, Switzerland, pp. 190-197.

U.S. Appl. No. 16/879,922, filed May 21, 2020, U.S. Pat. No. 11/393,042.

U.S. Appl. No. 14/324,742, filed Jul. 7, 2014, U.S. Pat. No. 10/769,727.

* cited by examiner

HOME TELEMATICS DEVICES AND INSURANCE APPLICATIONS

CROSS-REFERENCE TO RELATED APPLICATIONS

This application is a continuation of U.S. Non-Provisional patent application Ser. No. 16/879,922, filed May 21, 2020, which is a continuation of U.S. Non-Provisional patent application Ser. No. 14/324,742, filed Jul. 7, 2014, which claims the benefit of U.S. Provisional Patent Application No. 61/845,140, filed Jul. 11, 2013, the entire contents of each of which are incorporated herein by reference.

TECHNICAL FIELD

The subject matter is generally related to telematics, and more particularly, it relates to home telematics devices used for enhancing insurance services in the insurance industry.

BACKGROUND

Telematics is concerned with sending, receiving, and storing information via telecommunication devices in connection with the control of remote objects. Currently, telematics is implemented to track vehicles, in which case, the idiom is vehicle telematics. Vehicle telematics uses telecommunications and applications in vehicles to educe the behavior of drivers while vehicles are moving. Such educed behaviors influence insurance services that are offered to the drivers. There has been no application of telematics for use in the home.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

One aspect of the present subject matter includes a system form reciting a system comprising a voltage noise home telematics device, the hardware structure of which identifies device signatures of devices in a home that generate voltage noise detectable at an outlet. The system further comprises a claims inspections computer, the hardware structure of which is suitable for facilitating filing of a claim for a device that is stolen, damaged, or lost, the absence of the device being identified by the lack of its device signature formed from the voltage noise generated by the device.

Another aspect includes a method form of the subject matter reciting a method comprising streaming disturbances of operating devices in a home to sampling hardware, conditioning the disturbances in a form of a stream, sliding a sampling window to digitally sample the stream forming digitized samples, acquiring digitally a vector of features from the digitized samples, reacquiring the digitized samples if the vector of features has changed, storing the vector of features as a device signature of a device if the device is new, classifying the device as a type of device found in the home, and preparing electronically an insurance claim for the device by using the device signature of the device, the absence of the device being identified by the lack of its device signature formed from the vector of features generated by the device.

A further aspect includes a computer-readable medium form of the subject matter reciting a computer-readable medium, which is non-transient, having computer-executable instructions stored thereon for implementing a method comprising streaming disturbances of operating devices in a home to sampling hardware, conditioning the disturbances in a form of a stream, sliding a sampling window to digitally sample the stream forming digitized samples, acquiring digitally a vector of features from the digitized samples, reacquiring the digitized samples if the vector of features has changed, storing the vector of features as a device signature of a device if the device is new, comparing the vector of features against the stored device signature of the device, and flagging fraud if the vector of features indicates the presence of the device.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Various embodiments of the present subject matter engineer home telematics devices, the system of which is suitable for identifying and inventorying insurable devices in a home of an insured for insurance services. Software, on the home telematics devices and/or off-site software, such as in the cloud, is executed to automatically populate a device signature database regarding devices identified within the home via home telematics. When the insured installs home telematics devices at the insured's location, unique device signatures for all appliances, fixtures, and so on that generate voltage noise, pressure waves, and acoustic responses throughout the property are identified, inventoried, and continuously monitored. These device signatures provided by the home telematics devices are used to sense the presence of devices, such as light bulbs, fans, motors, HVAC systems, forced air heaters, stove, dryers, electric heaters, compressors, compact fluorescent lamps, motor appliances, any switched load, and any continuously switched devices including compact fluorescent lamps, television sets, DVD players, charging units, computers, mobile devices, and so on.

Various embodiments are engineered to use the inventory of devices in the insured's home to assist him in filing a claim with an insurer that is quick and easy after a theft or total loss by having an electronic record of the devices within the insured's home. Using the device signatures provided by home telematics devices' sensing an itemization technology, the subject matter identifies whether the insured attempted to commit fraud by filing a claim for theft or damaged devices that are still being detected at the insured's location. In some embodiments, the device signatures may pinpoint an insurance investigation to a cause of a fire due to operation of a device in the home. In another embodiment, the device signatures may reveal that a security system was turned off during a home invasion. In a few embodiments, the device signatures reveal that a device has failed or will fail so as to allow insurance services to warn the insured to take preventative measures to avoid accidents, such as water leakage from a washer in a condominium complex.

Figure 1:
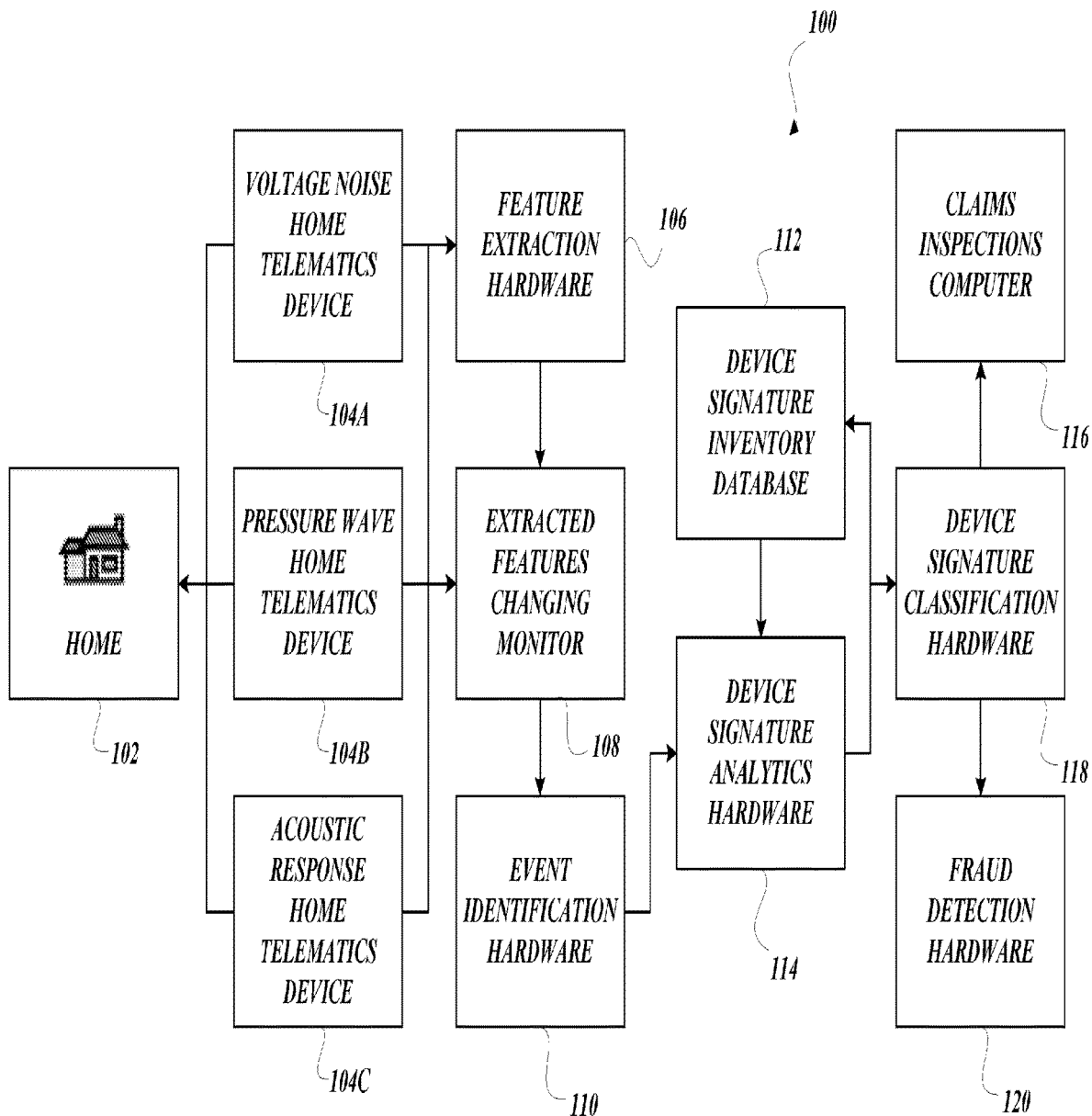
FIG. 1 is a block diagram illustrating an archetypical system with pieces of hardware.
Figure 2A:
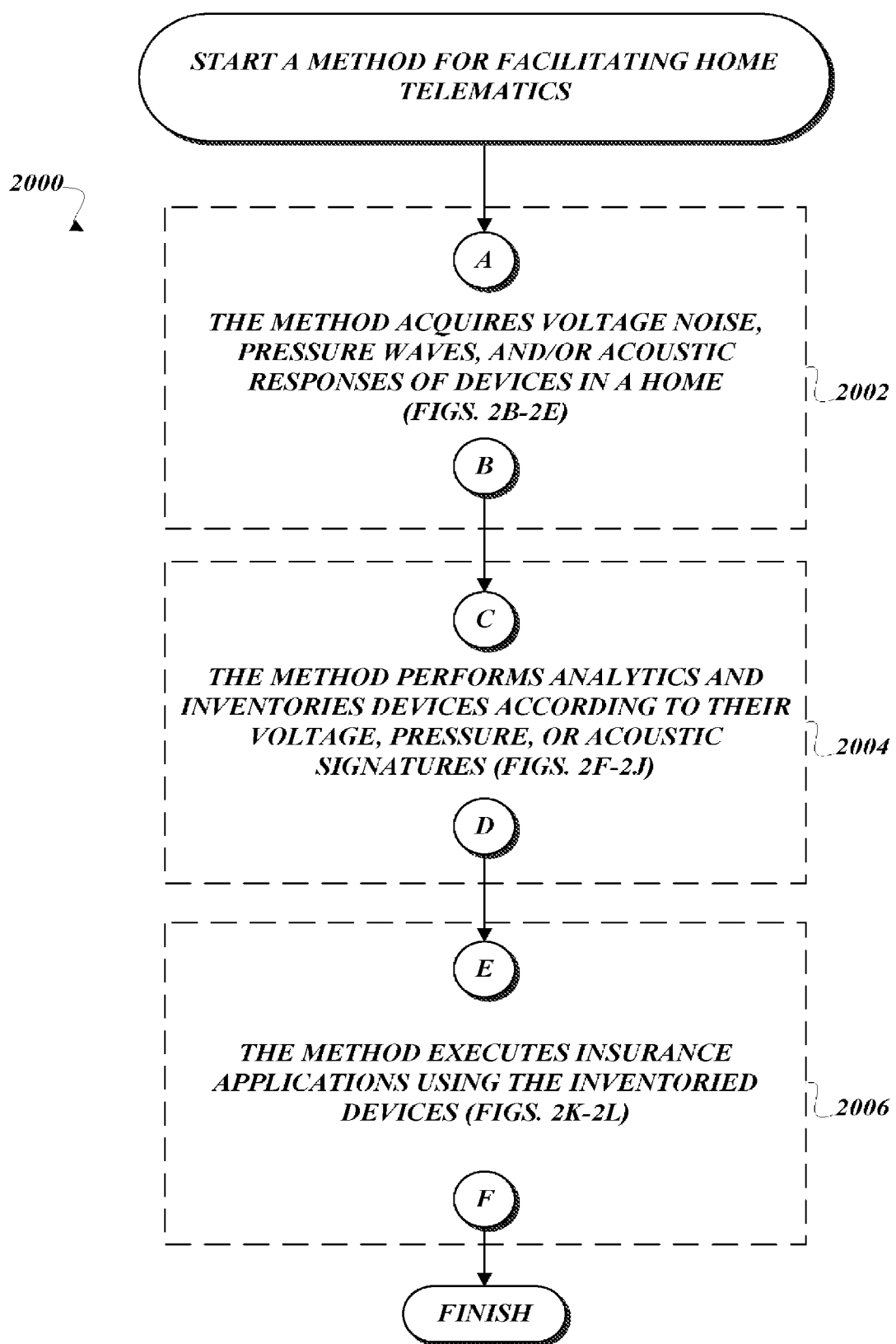
FIGS. 2A-2L are process diagrams implementing an archetypical method for facilitating home telematics.
Figure 2B:
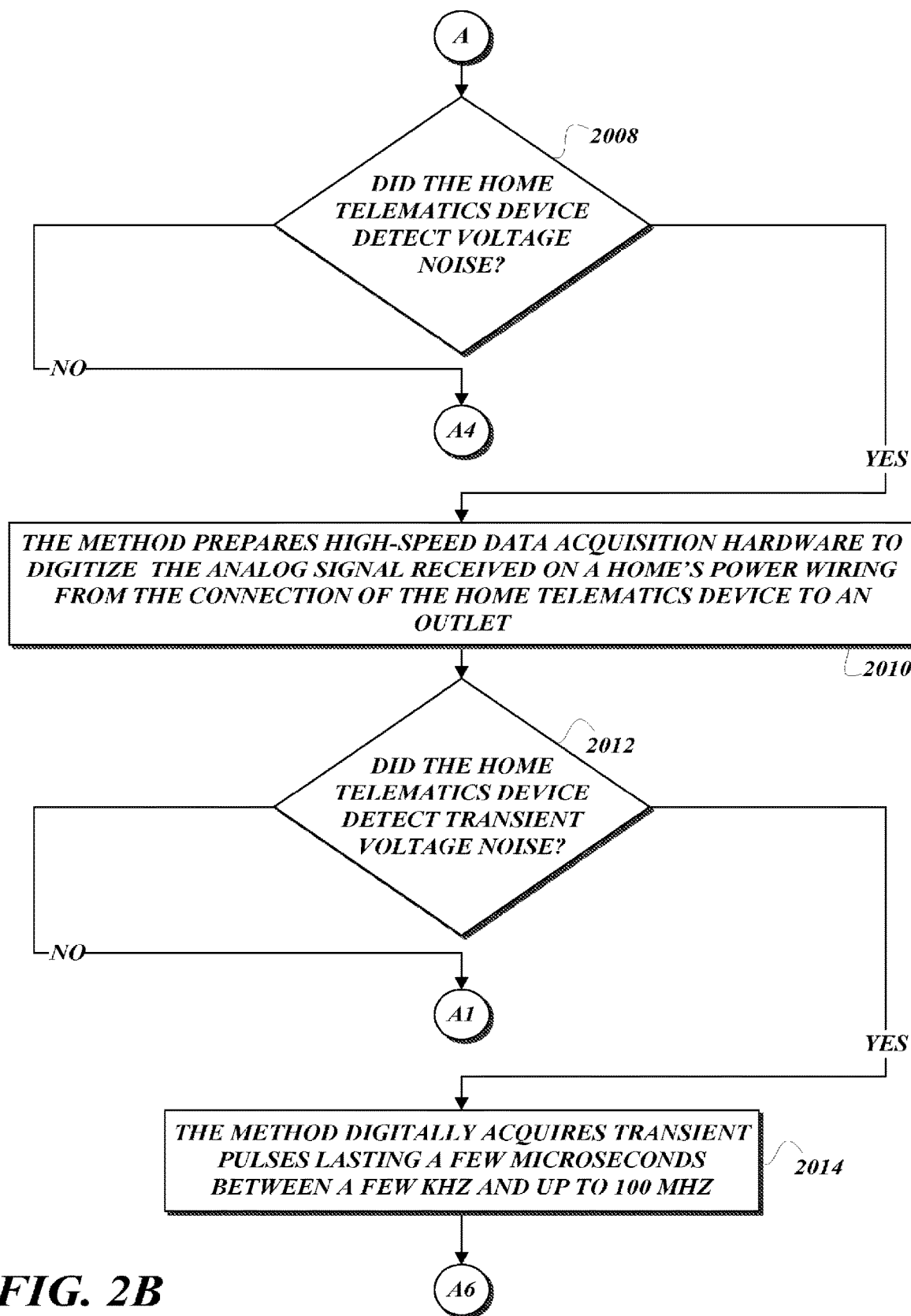
Figure 2C:
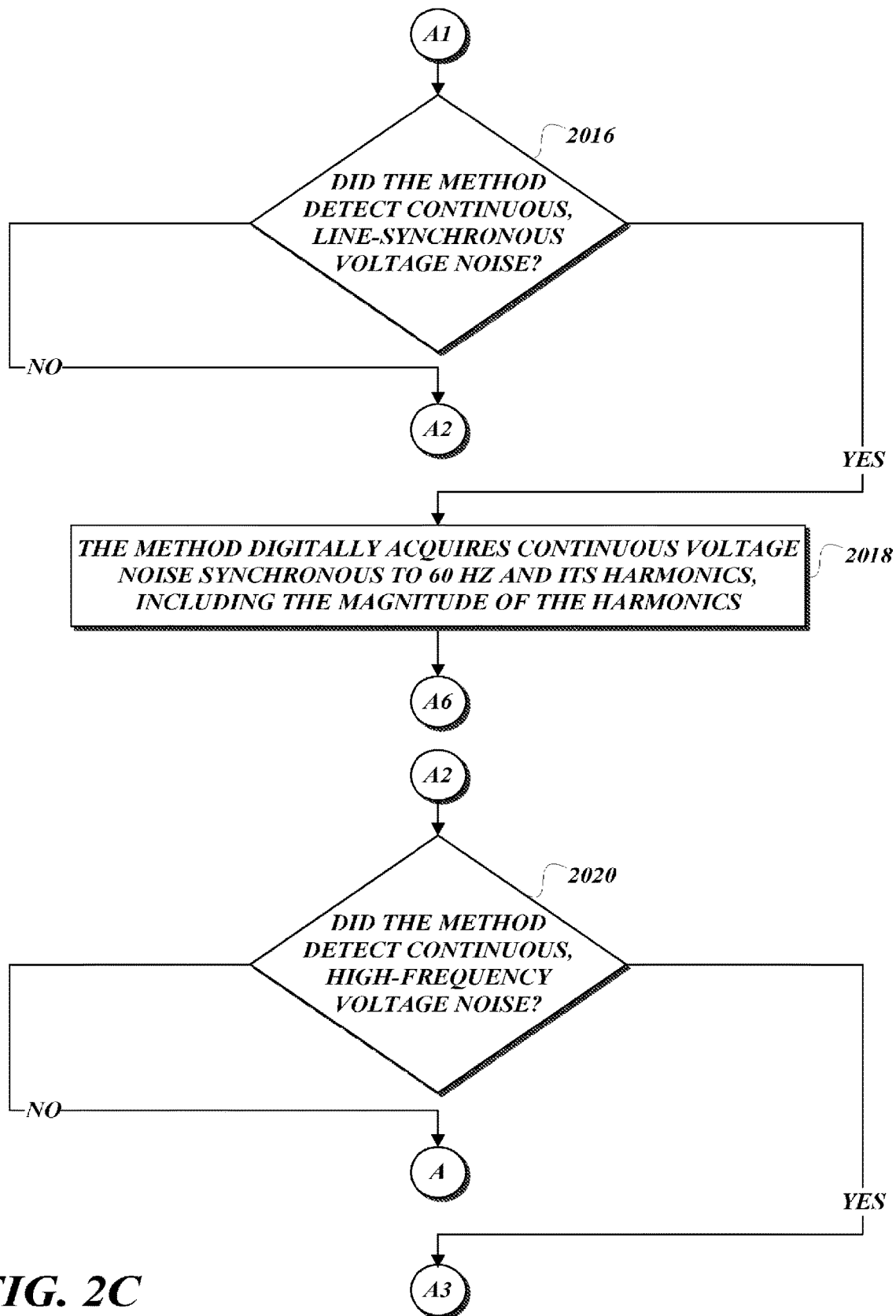
Figure 2D:
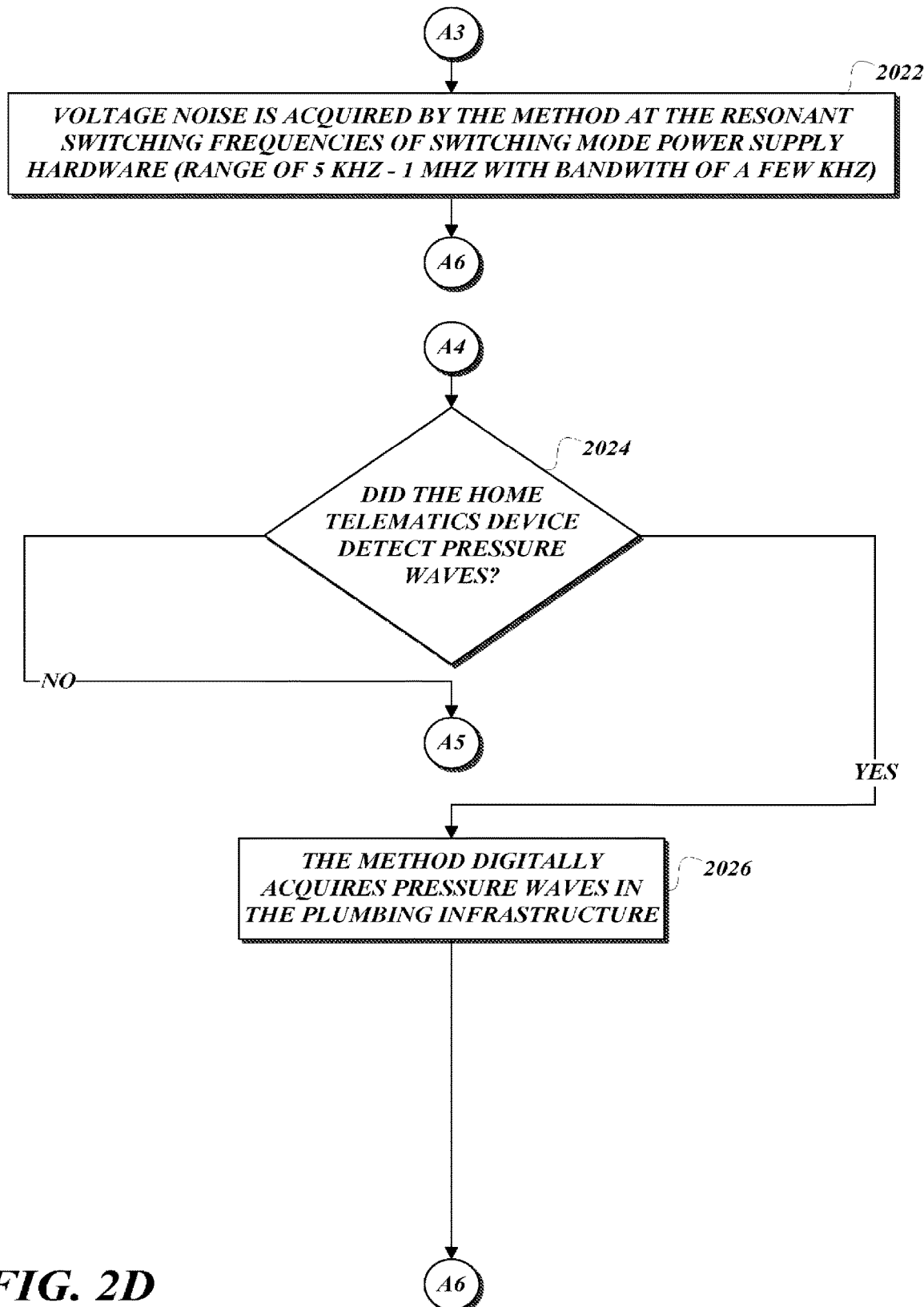
Figure 2E:
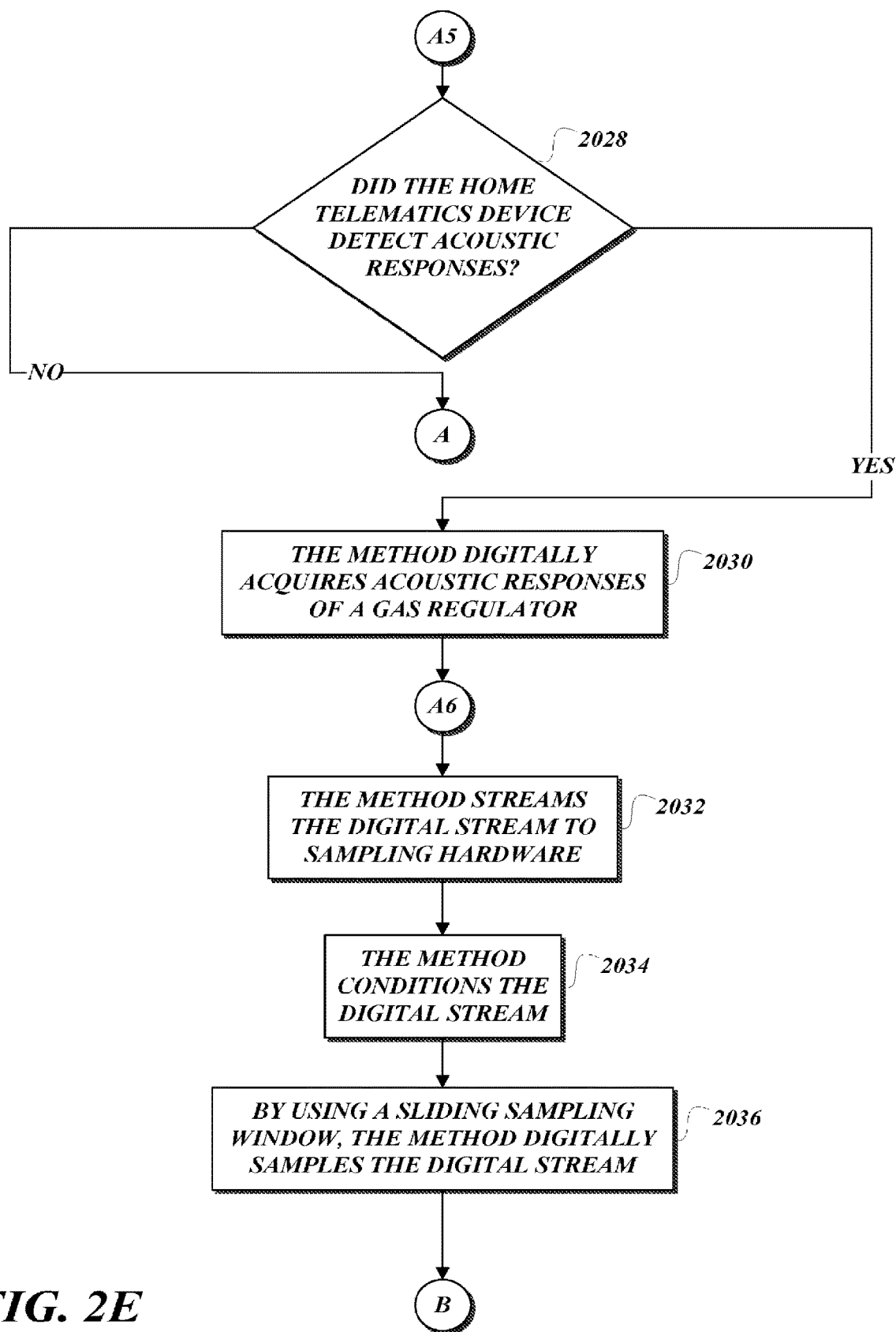
Figure 2F:
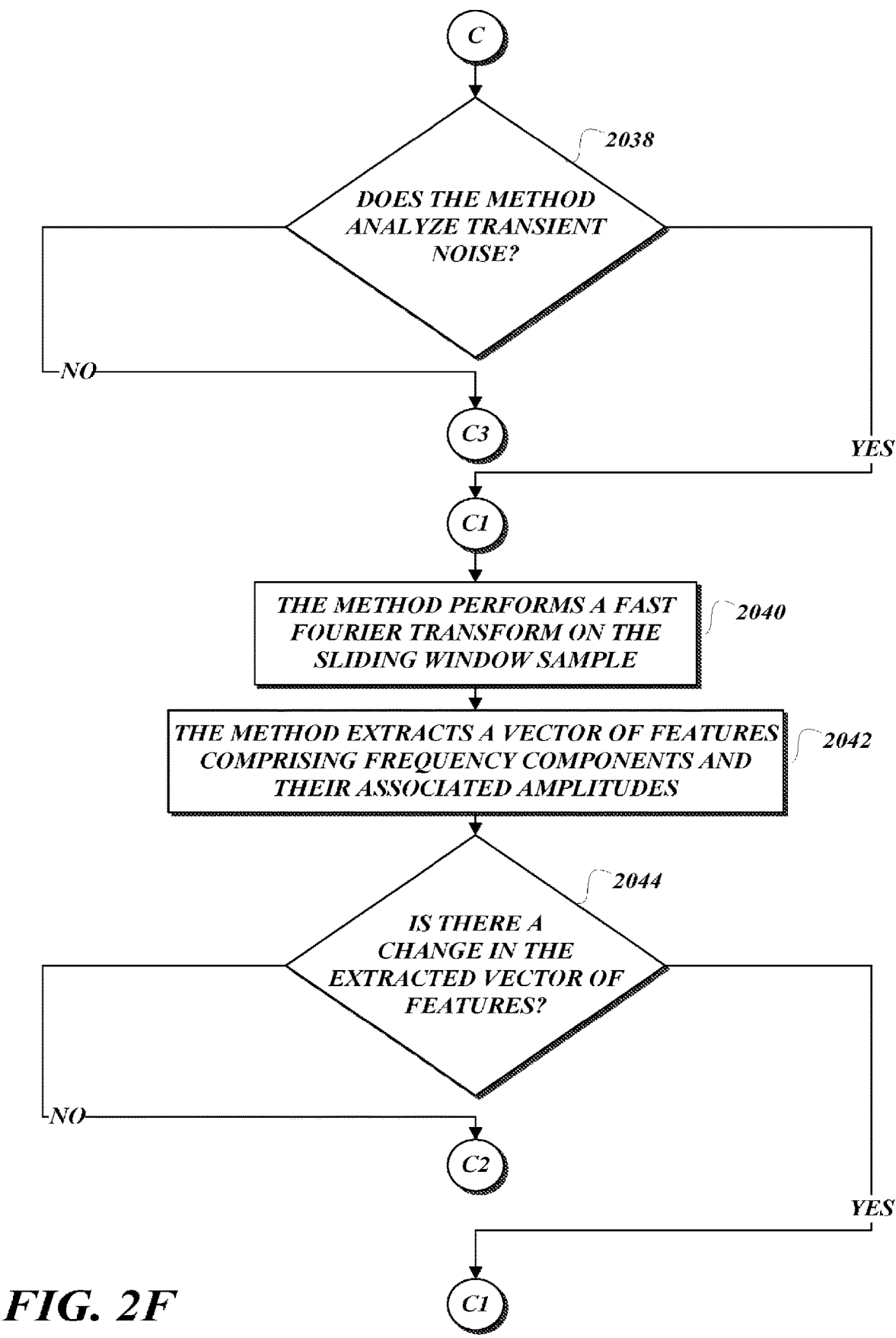
Figure 2G:
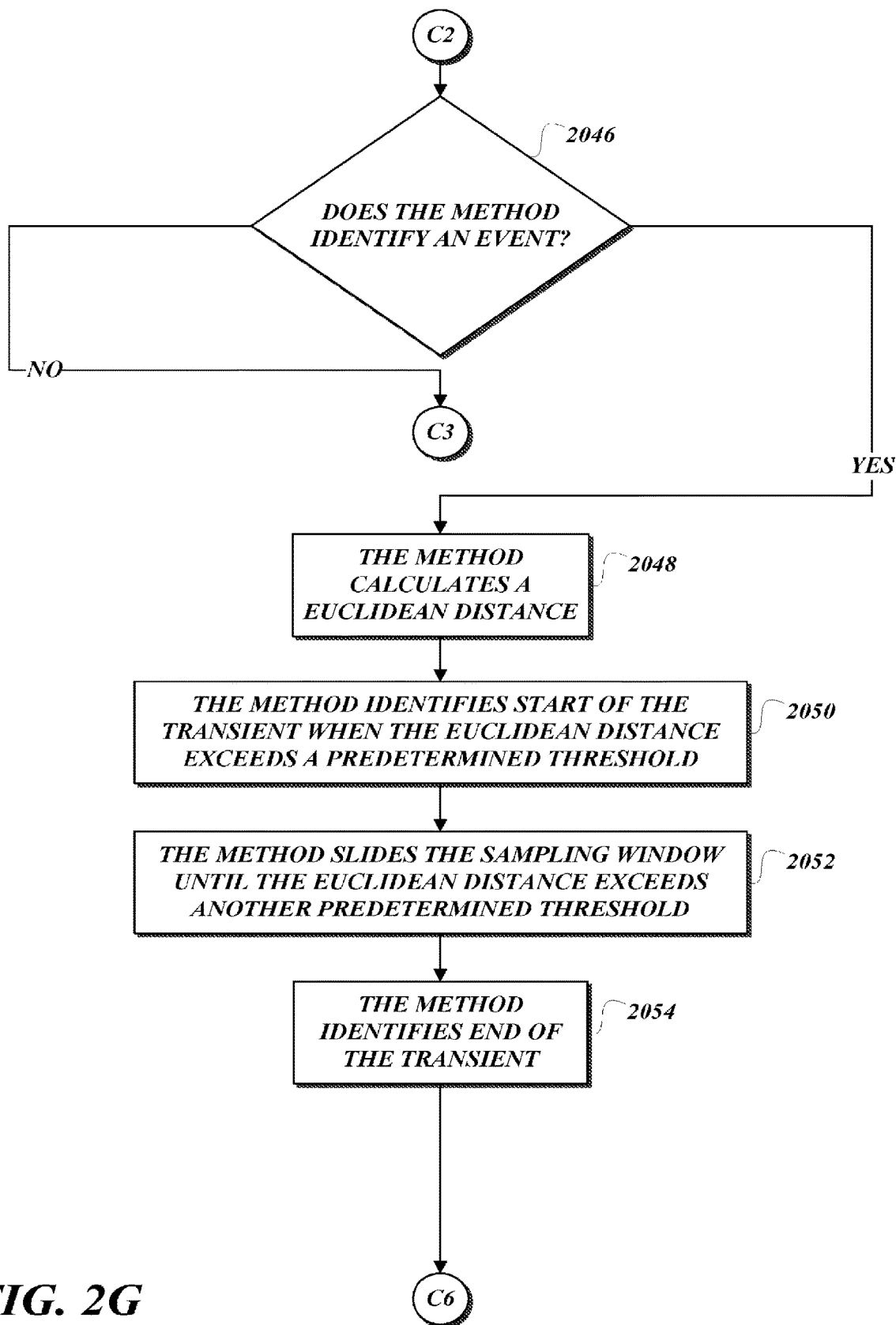
Figure 2H:
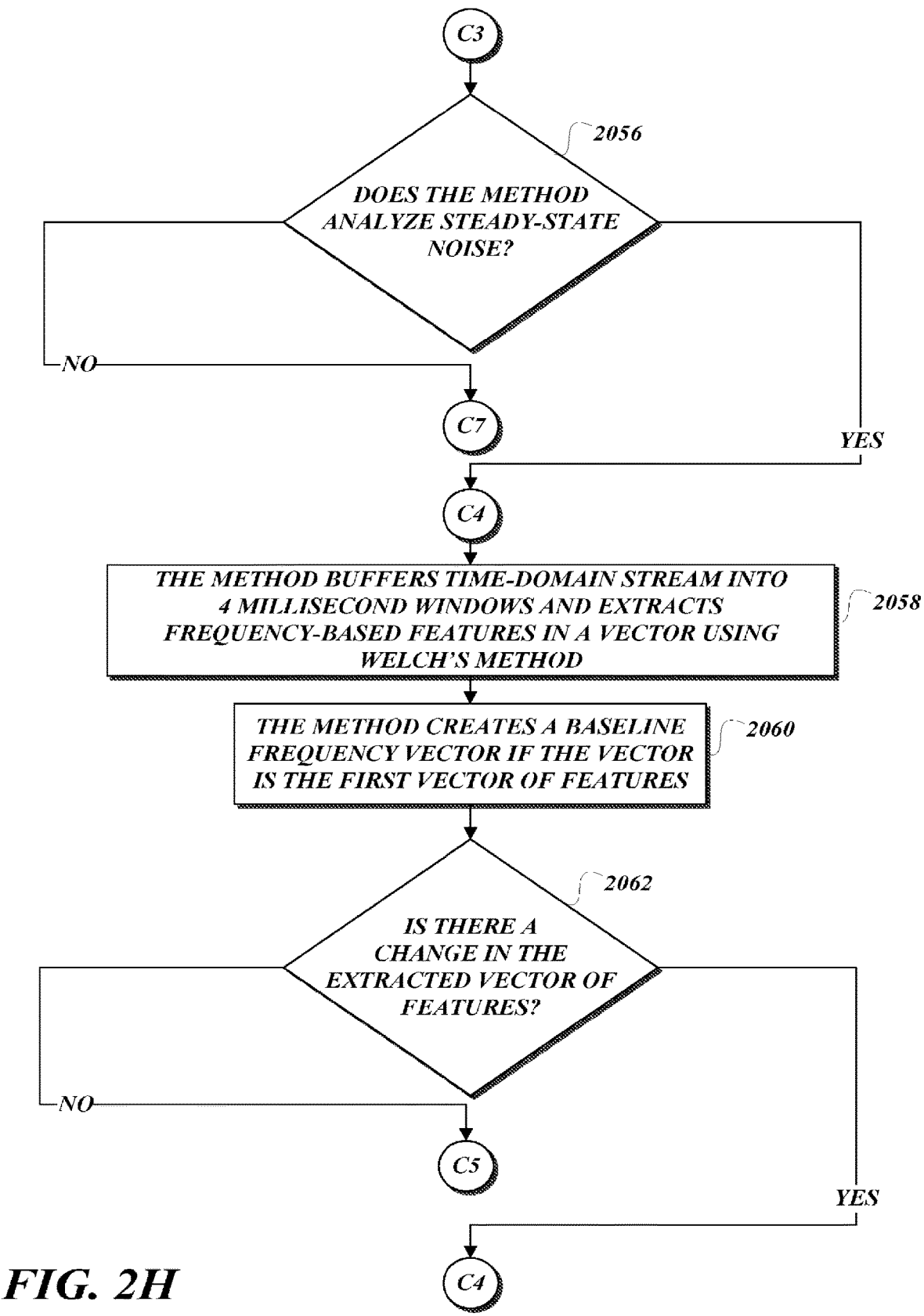
Figure 2I:
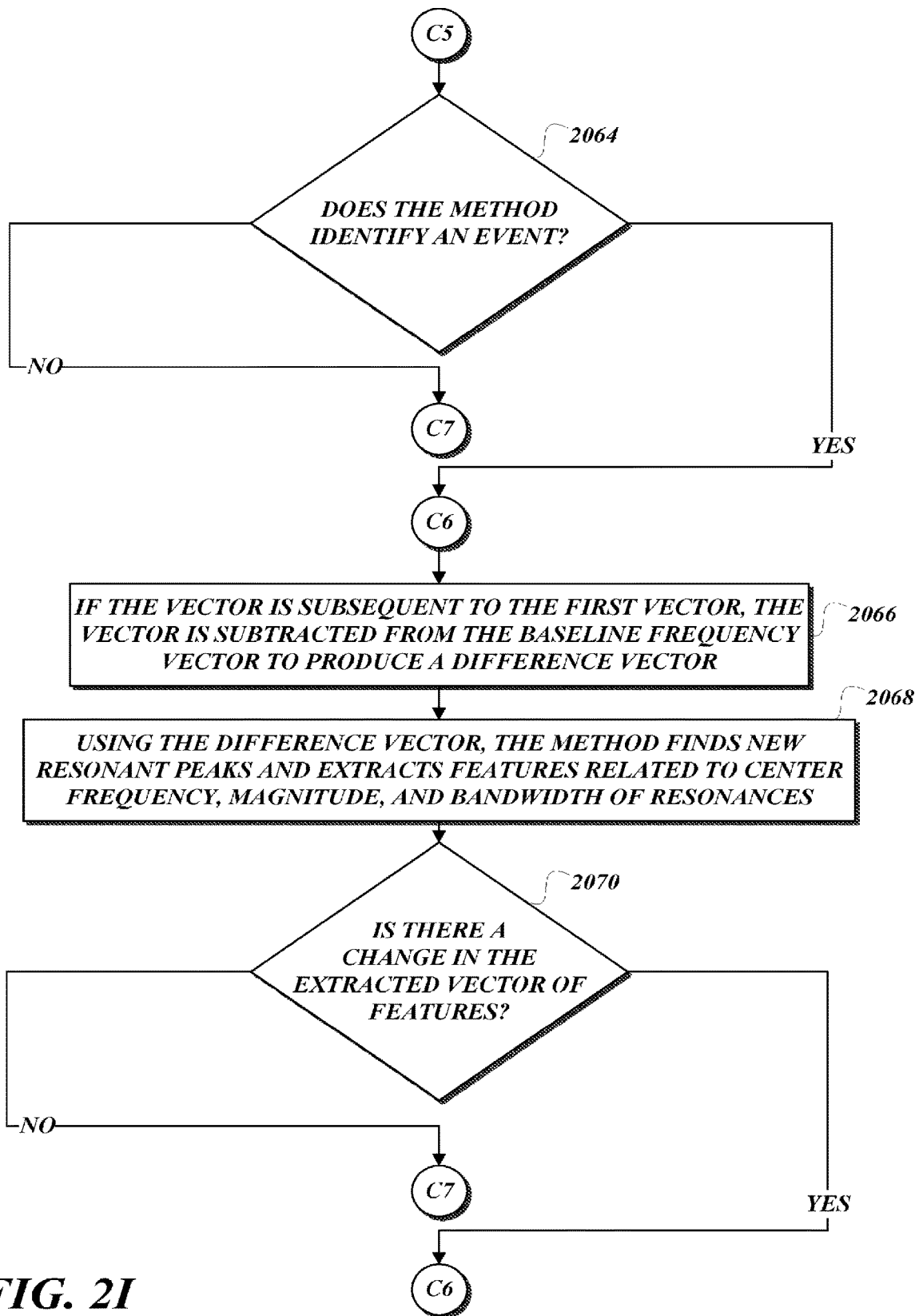
Figure 2J:
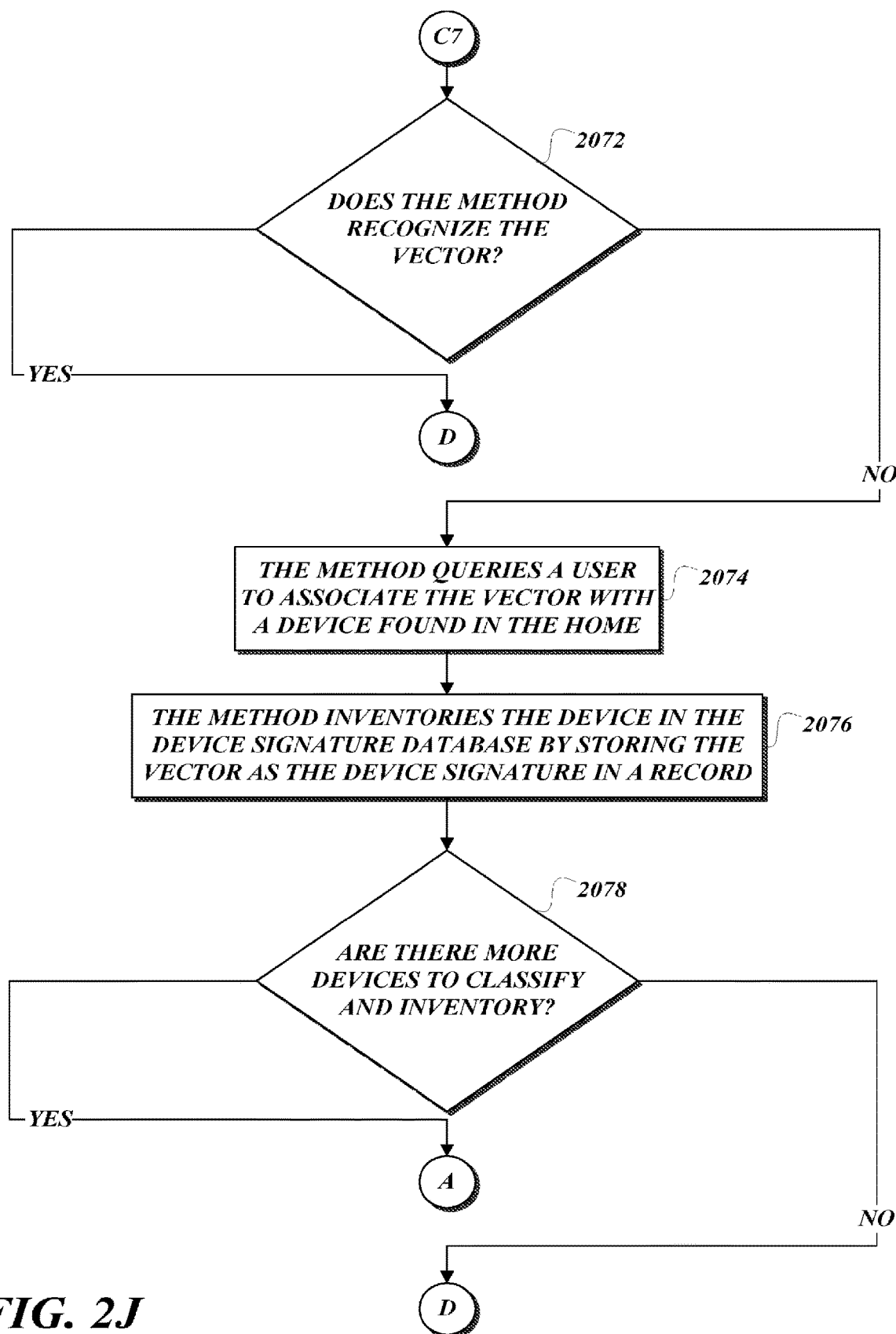
Figure 2K:
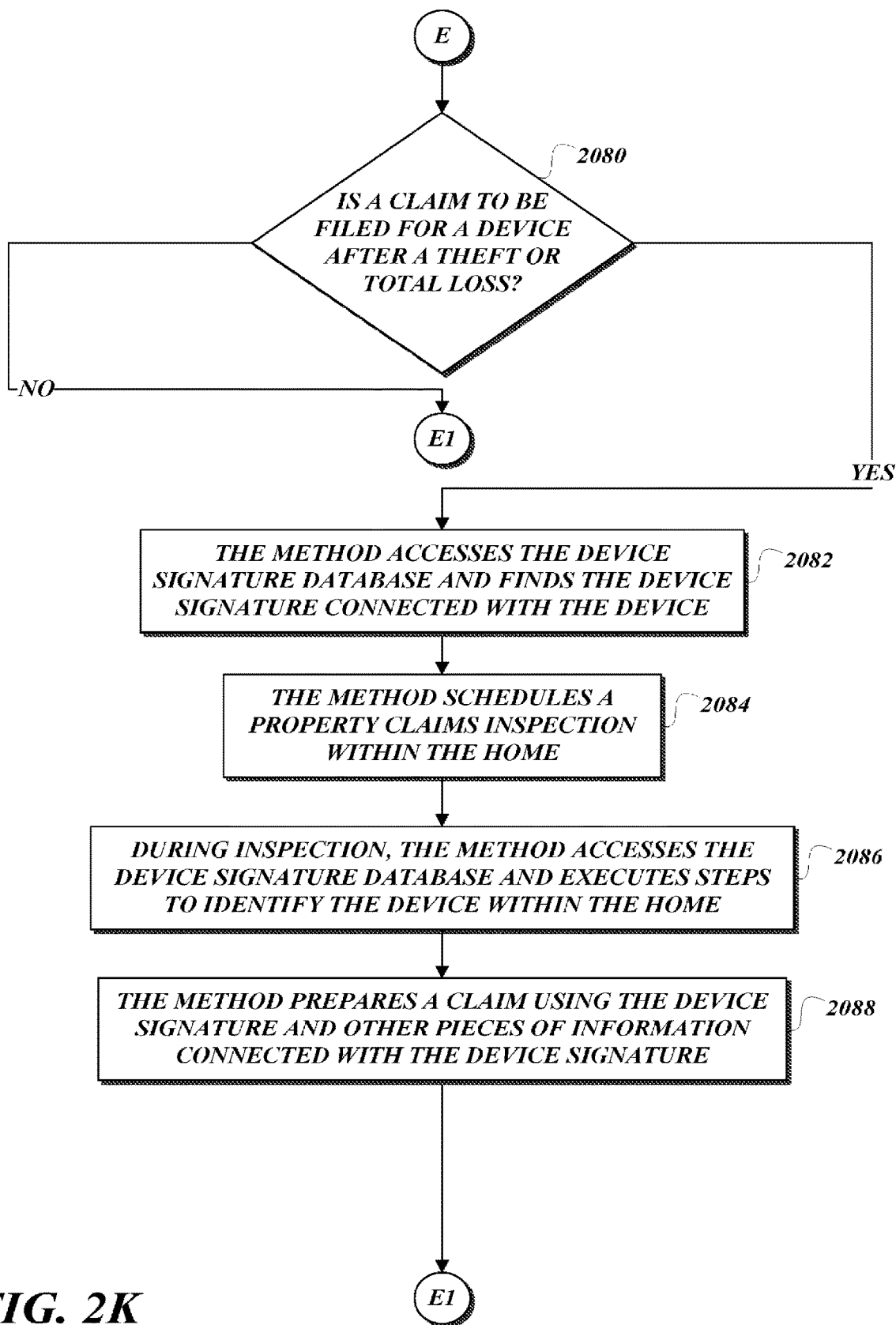
Figure 2L:
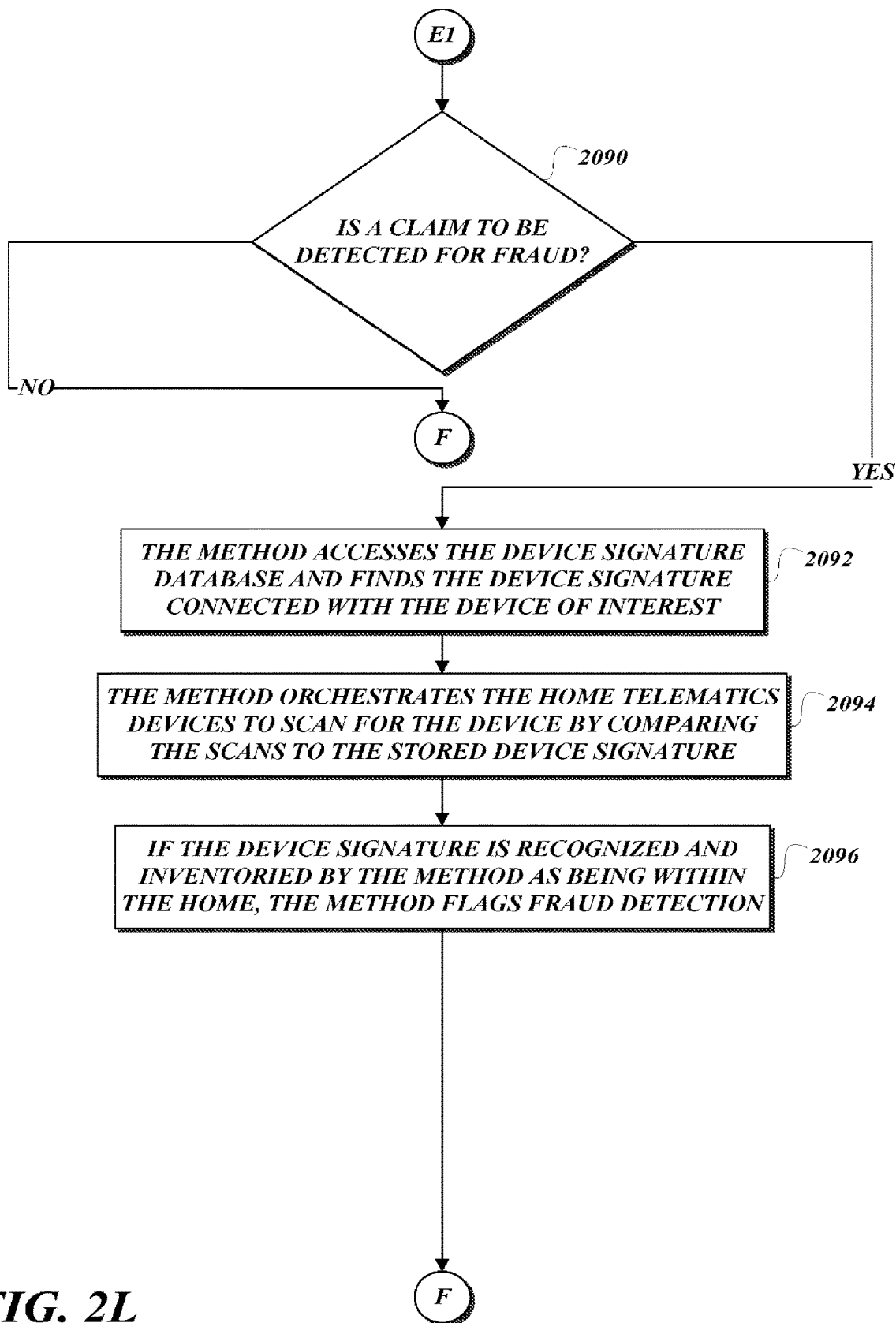

FIG. 1 illustrates a system 100 in which devices in a home 102 are detected by home telematics devices 104a-104c comprising voltage noise home telematics devices 104a, pressure wave home telematics devices 104b, and acoustic response home telematics devices 104c, all of which are engineered to monitor device disturbances generated electromagnetically, mechanically, or audibly by devices in the home 102 as they are turned on, off, or are in operation. In various embodiments, these home telematics devices 104a-104c have hardware, the structure of which is suitable for acquiring digitally, from an analog stream of disturbances, the voltage noise of devices, pressure waves of devices, and acoustic responses of devices.

The voltage noise home telematics device 104a has a hardware structure which is suitable for monitoring the home 102's internal electrical circuit via any outlet to obtain electromagnetic disturbances generated by electrical devices. The hardware structure of the voltage noise home telematics devices 104a includes any suitable sensing hardware, including smart meters capable of medium-rate sampling capability, current clamps or inductive sensors, current clamps or ammeters, voltmeter, high-sampling rate voltmeter, and medium-sampling rate voltmeter. The pressure wave home telematics device 104b has hardware structure which is capable of monitoring the home 102's internal plumbing to obtain mechanical disturbances generated by water usage of mechanical devices that access the home 102's internal plumbing by opening or closing their valves. The acoustic response home telematics device 104c has hardware structure which has the capacity to monitor the home 102's gas infrastructure to obtain acoustic disturbances generated by gas-operated devices.

This digital stream of information is presented to a feature extraction hardware 106 as well as an extracted features changing monitor 108. The feature extraction hardware 106 includes a hardware structure that is capable of extracting electrical, mechanical, or acoustical features from the digital stream that are then transformed mathematically into a vector of features forming a prospective device signature of a particular device in the home 102. The extracted features include real power in Watts, reactive power in VARs, apparent power taken from the absolute of alternating current, harmonics of the absolute of alternating current, startup disturbances of alternating current, absolute of alternating voltage, transient voltage noise, continuous voltage noise, pressure waves, and acoustic responses.

The extracted feature changing monitor 108 has a hardware structure that has the capacity to provide engineering redundancy to reduce or avoid errors in detecting the features in some embodiments. In one other embodiment, the extracted feature changing monitor 108 detects changes in the features away from normal operation and into failure of a device within a time period. Once the vector of features is confirmed, it is presented to an event identification hardware 110. The event identification hardware 110 has a hardware structure that is suitable for identifying various electrical, mechanical, or acoustical operations of the device in the home 102. For example, the event identification hardware 110 suitably may identify whether a device is turned on or off. The information analyzed by the event identification hardware 110 is then presented to a device signature analytics hardware 114. The device signature analytics hardware 114 has a hardware structure that is capable of identifying meaningful patterns in the vector of features to conclude whether or not the device signature analytics hardware 114 has encountered the vector of features before by comparing it with stored device signatures in a device signature inventory database 112. If the device signature analytics hardware 114 determines that the device has not been present in the home 102 before, options are presented to the insured of the home 102 to add the device to the device signature inventory database using its vector of features as its device signature.

The information is then presented to a device signature classification hardware 118, the hardware structure of which has the capacity to classify the types of devices that have been found by the system 100, such as light bulbs, fans, motors, HVAC systems, forced air heaters, stoves, dryers, electric heaters, compressors, compact fluorescent lamps, motor appliances, any switched load, any continuously switched devices including compact fluorescent lamps, television sets, DVD players, charging units, computers, mobile devices, washers, gas-operated devices, and so on. A claims inspections computer 116 utilizes the device signature classification hardware 118 via its hardware structure to facilitate the filing of claims by the insured of the home 102. A fraud detection hardware 120 has hardware structure that is suitable for detecting fraud in an insurance claim by determining whether the claimed device is present and still operating in the home 102.

FIGS. 2A-2L are process diagrams implementing an exemplary method 2000 for facilitating home telematics. From the start block, the method 2000 proceeds to a set of method steps 2002 defined between a continuation terminal ("terminal A") and another continuation terminal ("terminal B"). The set of method steps 2002 acquires voltage noise, pressure waves, and/or acoustic responses of devices in a home. From terminal A (FIG. 2B), the method 2000 proceeds to decision block 2008 where a test is performed to determine whether the home telematics device detects voltage noise. If the answer to the test at decision block 2008 is NO, the method proceeds to another continuation terminal ("terminal A4"). Otherwise, if the answer to the test at decision block 2008 is YES, the method proceeds to block 2010 where the method prepares high-speed data acquisition hardware to digitize the analog signal received on a home's power wiring from the connection of the home telematics device to an outlet. The method then proceeds to another decision block 2012 where another test is performed to determine whether the home telematics device detects transient voltage noise. If the answer to the test at decision block 2012 is NO, the method proceeds to another continuation terminal ("terminal A1"). Otherwise, if the answer to the test at decision block 2012 is YES, the method proceeds to block 2014 where the method digitally acquires transient pulses lasting a few microseconds between a few kilohertz and up to 100 megahertz. The method then continues to another continuation terminal ("terminal A6").

From terminal A1 (FIG. 2C), the method proceeds to decision block 2016 where a test is performed to determine whether the method detects continuous, line-synchronous voltage noise. If the answer to the test at decision block 2016 is NO, the method proceeds to another continuation terminal ("terminal A2"). Otherwise, if the answer to the test at decision block 2016 is YES, the method proceeds to block 2018 where the method digitally acquires continuous voltage noise synchronous to 60 hertz and its harmonics including the magnitude of the harmonics. The method then continues to terminal A6. From terminal A2 (FIG. 2C), the method proceeds to decision block 2020 where a test is performed to determine whether the method detects continuous, high-frequency voltage noise. If the answer to the test at decision block 2020 is NO, the method proceeds to terminal A and skips back to previously discussed processing steps. Otherwise, if the answer to the test at decision block 2020 is YES, the method proceeds to another continuation terminal ("terminal A3").

From terminal A3 (FIG. 2D), the method proceeds to block 2022 where voltage noise is acquired by the method at the resonant switching frequencies of switching mode power supply hardware in the range of 5 kilohertz up to 1 megahertz with bandwidth of a few kilohertz. The method then continues to terminal A6. From terminal A4 (FIG. 2D), the method proceeds to decision block 2024 where a test is performed to determine whether the home telematics device detects pressure waves. If the answer to the test at decision block 2024 is NO, the method proceeds to another continuation terminal ("terminal A5"). Otherwise, if the answer to the test at decision block 2024 is YES, the method proceeds to block 2026 where the method digitally acquires pressure waves in the plumbing infrastructure. The method then continues to terminal A6.

From terminal A5 (FIG. 2E), the method proceeds to decision block 2028 where a test is performed to determine whether the home telematics device detects acoustic responses. If the answer to the test at decision block 2028 is NO, the method proceeds to terminal A and skips back to previously discussed processing steps. Otherwise, if the answer to the test at decision block 2028 is YES, the method proceeds to block 2030 where the method digitally acquires acoustic responses of a gas regulator. The method then continues to terminal A6. From terminal A6 (FIG. 2E), the method proceeds to block 2032 where the method streams the digital stream to sampling hardware. Next, at block 2034, the method conditions the digital stream. At block 2036, by using a sliding sampling window, the method digitally samples the digital stream. The method then continues to terminal B.

From terminal B (FIG. 2A), the method proceeds to a set of method steps 2004 defined between a continuation terminal ("terminal C") and another continuation terminal ("terminal D"). The set of method steps 2004 performs analytics and inventories devices according to their voltage, pressure, or acoustic signatures. From terminal C (FIG. 2F), the method proceeds to decision block 2038 where a test is performed to determine whether the method analyzes transient noise. If the answer to the test at decision block 2038 is NO, the method proceeds to another continuation terminal ("terminal C3"). Otherwise, if the answer to the test at decision block 2038 is YES, the method proceeds to another continuation terminal ("terminal C1"). From terminal C1 (FIG. 2F), the method proceeds to block 2040 where the method performs a fast Fourier transform on the sliding window sample. At block 2042, the method extracts a vector of features comprising frequency components and their associated amplitudes. At decision block 2044, a test is performed to determine whether there is a change in the extracted vector of features. If the answer to the test at decision block 2044 is NO, the method proceeds to another continuation terminal ("terminal C2"). Otherwise, if the answer to the test at decision block 2044 is YES, the method proceeds to terminal C1 and skips back to previously discussed processing steps.

From terminal C2 (FIG. 2G), the method proceeds to decision block 2046 where a test is performed to determine whether the method identifies an event. If the answer to the test at decision block 2046 is NO, the method proceeds to another continuation terminal ("terminal C3"). Otherwise, if the answer to the test at decision block 2046 is YES, the method proceeds to block 2048 where the method calculates a Euclidean distance. At block 2050, the method identifies the start of the transient when the Euclidean distance exceeds a predetermined threshold. At block 2052, the method slides the sampling window until the Euclidean distance exceeds another predetermined threshold. At block 2054, the method identifies the end of the transient. The method then continues to terminal C6.

From terminal C3 (FIG. 2H), the method proceeds to decision block 2056 where a test is performed to determine whether the method analyzes steady-state noise. If the answer to the test at decision block 2056 is NO, the method proceeds to another continuation terminal ("terminal C7"). Otherwise, if the answer to the test at decision block 2056 is YES, the method proceeds to terminal C4. From terminal C4 (FIG. 2H), the method proceeds to block 2058 where the method buffers a time-domain stream into four-millisecond windows and extracts frequency-based features in a vector using Welch's method. At block 2060, the method creates a baseline frequency vector if the vector is the first vector of features. The method proceeds to decision block 2062 where a test is performed to determine whether there is a change in the extracted vector of features. If the answer to the test at decision block 2062 is NO, the method proceeds to another continuation terminal ("terminal C5"). Otherwise, if the answer to the test at decision block 2062 is YES, the method proceeds to terminal C4 and skips back to previously discussed processing steps.

From terminal C5 (FIG. 2I), the method proceeds to decision block 2064 where a test is performed to determine whether the method identifies an event. If the answer to the test at decision block 2064 is NO, the method proceeds to another continuation terminal ("terminal C7"). Otherwise, if the answer to the test at decision block 2064 is YES, the method proceeds to terminal C6. From terminal C6 (FIG. 2I), the method proceeds to block 2066 where if the vector is subsequent to the first vector, the vector is subtracted from the baseline frequency vector to produce a difference vector. At block 2068, using the difference vector, the method finds new resonant peaks and extracts features related to center frequency, magnitude, and bandwidth of resonances. The method then continues to decision block 2070 where a test is performed to determine whether there is a change in the extracted vector of features. If the answer to the test at decision block 2070 is NO, the method proceeds to terminal C7. Otherwise, if the answer to the test at decision block 2070 is YES, the method proceeds to terminal C6 and skips back to previously discussed processing steps.

From terminal C7 (FIG. 2J), the method proceeds to decision block 2072 where a test is performed to determine whether the method recognizes the vector. If the answer to the test at decision block 2072 is YES, the method proceeds to terminal D. Otherwise, if the answer to the test at decision block 2072 is NO, the method proceeds to block 2074 where the method queries a user to associate the vector with a device found in the home. At block 2076, the method inventories the device in the device signature database by storing the vector as the device signature in a record. The method then proceeds to decision block 2078 where a test is performed to determine whether there are more devices to classify and inventory. If the answer to the test at decision block 2078 is YES, the method proceeds to terminal A and skips back to previously discussed processing steps. Otherwise, if the answer to the test at decision block 2078 is NO, the method proceeds to terminal D.

From terminal D (FIG. 2A), the method proceeds to a set of method steps 2006 defined between a continuation terminal ("terminal E") and another continuation terminal ("terminal F"). The set of method steps 2006 executes insurance applications using the inventoried devices. From terminal E (FIG. 2K), the method proceeds to decision block 2080 where a test is performed to determine whether a claim is to be filed for a device after a theft or total loss. If the answer to the test at decision block 2080 is NO, the method proceeds to another continuation terminal ("terminal E1"). Otherwise, if the answer to the test at decision block 2080 is YES, the method proceeds to block 2082 where the method accesses the device signature database and finds the device signature connected with the device. At block 2084, the method schedules a property claims inspection within the home. At block 2086, during inspection, the method accesses the device signature database and executes steps to identify the device within the home. The method then continues to block 2088 where the method prepares a claim using the device signature and other pieces of information connected with the device signature. The method then continues to terminal E1.

From terminal E1 (FIG. 2L), the method proceeds to decision block 2090 where a test is performed to determine whether a claim is to be evaluated for fraud. If the answer to the test at decision block 2090 is NO, the method proceeds to terminal F and terminates execution. Otherwise, if the answer to the test at decision block 2090 is YES, the method proceeds to block 2092 where the method accesses the device signature database and finds the device signature connected with the device of interest. At block 2094, the method orchestrates the home telematics devices to scan for the device by comparing the scans to the stored device signature. At block 2096, if the device signature is recognized and inventoried by the method as being within the home and/or operating within the home, the method flags fraud detection. The method then continues to terminal F and terminates execution.

While illustrative embodiments have been illustrated and described, it will be appreciated that various changes can be made therein without departing from the spirit and scope of the invention.

The embodiments of the invention in which an exclusive property or privilege is claimed are defined as follows:

1. An apparatus comprising one or more processors and one or more memories storing instructions that, with the one or more processors, configure the apparatus to:
   prepare an electronic insurance claim for a first operating device associated with a residence;
   scan digital streams associated with a plurality of operating devices within the residence to generate respective vectors of features representative of respective device signatures for each operating device of the plurality of operating devices within the residence, wherein scanning the digital streams comprises forming digital samples based at least in part on sliding sampling windows on the digital streams;
   retrieve, from an operating device inventory associated with the residence, a plurality of stored vectors of features representative of stored respective device signatures for each inventoried operating device within the residence;
   compare the respective device signatures to the stored respective device signatures; and
   upon determining that a first vector of features representative of a first device signature associated with the first operating device is within the respective device signatures, associate a fraud indication with the electronic insurance claim for the first operating device.

2. The apparatus of claim 1, wherein the digital streams comprise the digital samples representative of one or more of (a) transient voltage noise, (b) continuous, line-synchronous voltage noise, (c) continuous, high-frequency voltage noise, (d) pressure waves in the plumbing infrastructure, or (e) acoustic responses of a gas regulator.

3. The apparatus of claim 2, wherein the digital samples are generated by sampling analog signals received from operating devices.

4. The apparatus of claim 1, wherein each inventoried operating device is associated with a classification.

5. The apparatus of claim 1, wherein an operating device is one of an appliance, a fixture, a light bulb, a fan, a motor, an HVAC system, a forced air heater, a stove, a dryer, an electric heater, a compressor, a compact fluorescent lamp, a motor appliance, a gas-operated device, a mechanical device, a switched load, a television set, a DV player, a charging unit, a computer, or a mobile device.

6. The apparatus of claim 1, wherein the one or more memories store instructions that, with the one or more processors, further configure the apparatus to:
   determine that the first device signature for the first operating device is in the operating device inventory associated with the residence.

7. A method, comprising:
   preparing an electronic insurance claim for a first operating device associated with a residence;
   scanning digital streams associated with a plurality of operating devices within the residence to generate respective vectors of features representative of respective device signatures for each operating device of the plurality of operating devices within the residence, wherein scanning the digital streams comprises forming digital samples based at least in part on sliding sampling windows on the digital streams;
   retrieving, from an operating device inventory associated with the residence, a plurality of stored vectors of features representative of stored respective device signatures for each inventoried operating device within the residence;
   comparing the respective device signatures to the stored respective device signatures; and
   upon determining that a first vector of features representative of a first device signature associated with the first operating device is within the respective device signatures, associating a fraud indication with the electronic insurance claim for the first operating device.

8. The method of claim 7, wherein the digital streams comprise the digital samples representative of one or more of (a) transient voltage noise, (b) continuous, line-synchronous voltage noise, (c) continuous, high-frequency voltage noise, (d) pressure waves in the plumbing infrastructure, or (e) acoustic responses of a gas regulator.

9. The method of claim 8, wherein the digital samples are generated based at least in part on analog signals received from operating devices.

10. The method of claim 7, wherein each inventoried operating device is associated with a classification.

11. The method of claim 7, wherein an operating device is one of an appliance, a fixture, a light bulb, a fan, a motor, an HVAC system, a forced air heater, a stove, a dryer, an electric heater, a compressor, a compact fluorescent lamp, a motor appliance, a gas-operated device, a mechanical device, a switched load, a television set, a DV player, a charging unit, a computer, or a mobile device.

12. The method of claim 7, further comprising:
determining that the first device signature for the first operating device is in the operating device inventory associated with the residence.

13. A non-transitory computer-readable medium having computer-executable instructions stored thereon that, when executed by an apparatus, configure the apparatus to:
prepare an electronic insurance claim for a first operating device associated with a residence;
scan digital streams associated with a plurality of operating devices within the residence to generate respective vectors of features representative of respective device signatures for each operating device of the plurality of operating devices within the residence, wherein scanning the digital streams comprises forming digital samples based at least in part on sliding sampling windows on the digital streams;
retrieve, from an operating device inventory associated with the residence, a plurality of stored vectors of features representative of stored respective device signatures for each inventoried operating device within the residence;
compare the respective device signatures to the stored respective device signatures; and
upon determining that a first vector of features representative of a first device signature associated with the first operating device is within the respective device signatures, associate a fraud indication with the electronic insurance claim for the first operating device.

14. The non-transitory computer-readable medium of claim 13, wherein the digital streams comprise the digital samples representative of one or more of (a) transient voltage noise, (b) continuous, line-synchronous voltage noise, (c) continuous, high-frequency voltage noise, (d) pressure waves in the plumbing infrastructure, or (e) acoustic responses of a gas regulator.

15. The non-transitory computer-readable medium of claim 14, wherein the digital samples are generated based at least in part on analog signals received from operating devices.

16. The non-transitory computer-readable medium of claim 13, wherein each inventoried operating device is associated with a classification.

17. The non-transitory computer-readable medium of claim 13, wherein an operating device is one of an appliance, a fixture, a light bulb, a fan, a motor, an HVAC system, a forced air heater, a stove, a dryer, an electric heater, a compressor, a compact fluorescent lamp, a motor appliance, a gas-operated device, a mechanical device, a switched load, a television set, a DV player, a charging unit, a computer, or a mobile device.

18. The non-transitory computer-readable medium of claim 13, having computer-executable instructions stored thereon that, when executed by the apparatus, further configure the apparatus to:
determine that the first device signature for the first operating device is in the operating device inventory associated with the residence.

* * * * *